United States Patent
Chang et al.

(10) Patent No.: US 8,014,310 B2
(45) Date of Patent: Sep. 6, 2011

(54) APPARATUS AND METHOD FOR VISUALIZING NETWORK SITUATION USING SECURITY CUBE

(75) Inventors: Beom-Hwan Chang, Daejeon (KR); Chi-Yoon Jeong, Daejeon (KR); Seon-Gyoung Sohn, Daejeon (KR); Soo-Hyung Lee, Daejeon (KR); Hyo-Chan Bang, Daejeon (KR); Geon-Lyang Kim, Daejeon (KR); Hyun-Joo Kim, Seoul (KR); Won-Joo Park, Daejeon (KR); Jong-Ho Ryu, Cheonan (KR); Jong-Hyun Kim, Daejeon (KR); Jong-Soo Jang, Daejeon (KR); Sung-Won Sohn, Daejeon (KR); Jung-Chan Na, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 141 days.

(21) Appl. No.: 12/516,494

(22) PCT Filed: Aug. 23, 2007

(86) PCT No.: PCT/KR2007/004043
§ 371 (c)(1),
(2), (4) Date: May 27, 2009

(87) PCT Pub. No.: WO2008/066238
PCT Pub. Date: Jun. 5, 2008

(65) Prior Publication Data
US 2010/0067391 A1    Mar. 18, 2010

(30) Foreign Application Priority Data
Nov. 27, 2006 (KR) .................. 10-2006-0117566

(51) Int. Cl.
*H04L 12/26* (2006.01)

(52) U.S. Cl. .............. 370/252; 370/241; 726/25
(58) Field of Classification Search .......... 370/252, 370/253, 241, 242; 725/22–25; 345/418, 345/419
See application file for complete search history.

(56) References Cited

U.S. PATENT DOCUMENTS

| | | | |
|---|---|---|---|
| 6,400,766 B1 | 6/2002 | Lafe | |
| 6,906,709 B1 * | 6/2005 | Larkin et al. | 345/419 |
| 7,681,132 B2 * | 3/2010 | Treinen | 715/736 |
| 2003/0145232 A1 | 7/2003 | Poletto et al. | |

(Continued)

FOREIGN PATENT DOCUMENTS

KR    2001-0018998    3/2001

(Continued)

OTHER PUBLICATIONS

Kim, Hyogon et al., "Real-time Visualization of Network Attacks on High-Speed Links," IEEE Network, vol. 18(5):2-12 (2004).

*Primary Examiner* — Ricky Ngo
*Assistant Examiner* — Gary Mui
(74) *Attorney, Agent, or Firm* — Nelson Mullins Riley & Scarborough LLP; EuiHoon Lee, Esq.

(57) ABSTRACT

An apparatus and method for visualizing a network condition related to a network security are provided. The apparatus includes a traffic feature extracting unit, a network condition displaying unit, and a traffic abnormal condition determining unit. The traffic feature extracting unit extracts information including source address, source port, destination address, and destination port from network traffics, selects two of the extracted information, and calculates unique dispersion degrees of two unselected information. The network condition displaying unit displays a two-dimensional cube expressed using the calculated unique dispersion degrees for the classified traffics. The traffic abnormal condition determining unit determines whether the traffics are in an abnormal condition or not based on the two-dimensional security cube.

26 Claims, 15 Drawing Sheets

U.S. PATENT DOCUMENTS

2005/0278779 A1 12/2005 Koppol et al.
2006/0140127 A1 6/2006 Lee et al.

FOREIGN PATENT DOCUMENTS

| KR | 2001-0085057 | 9/2001 |
| KR | 2003-0003981 | 1/2003 |
| KR | 2004-0072365 | 8/2004 |
| KR | 2005-0032765 | 4/2005 |
| KR | 2006-0013120 | 2/2006 |
| KR | 2006-0042788 | 5/2006 |
| KR | 2006-0046812 | 5/2006 |
| KR | 2006-0076337 | 7/2006 |

\* cited by examiner

[Fig. 1]
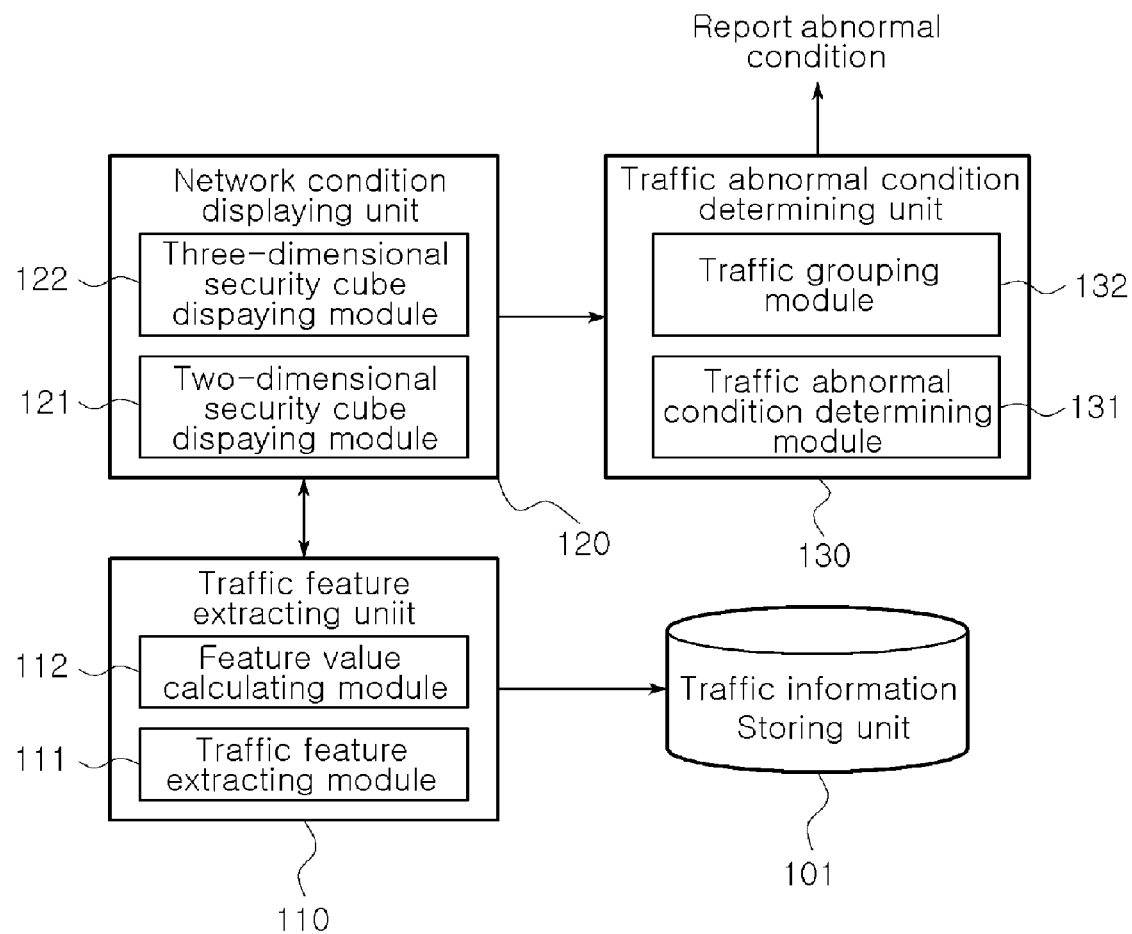

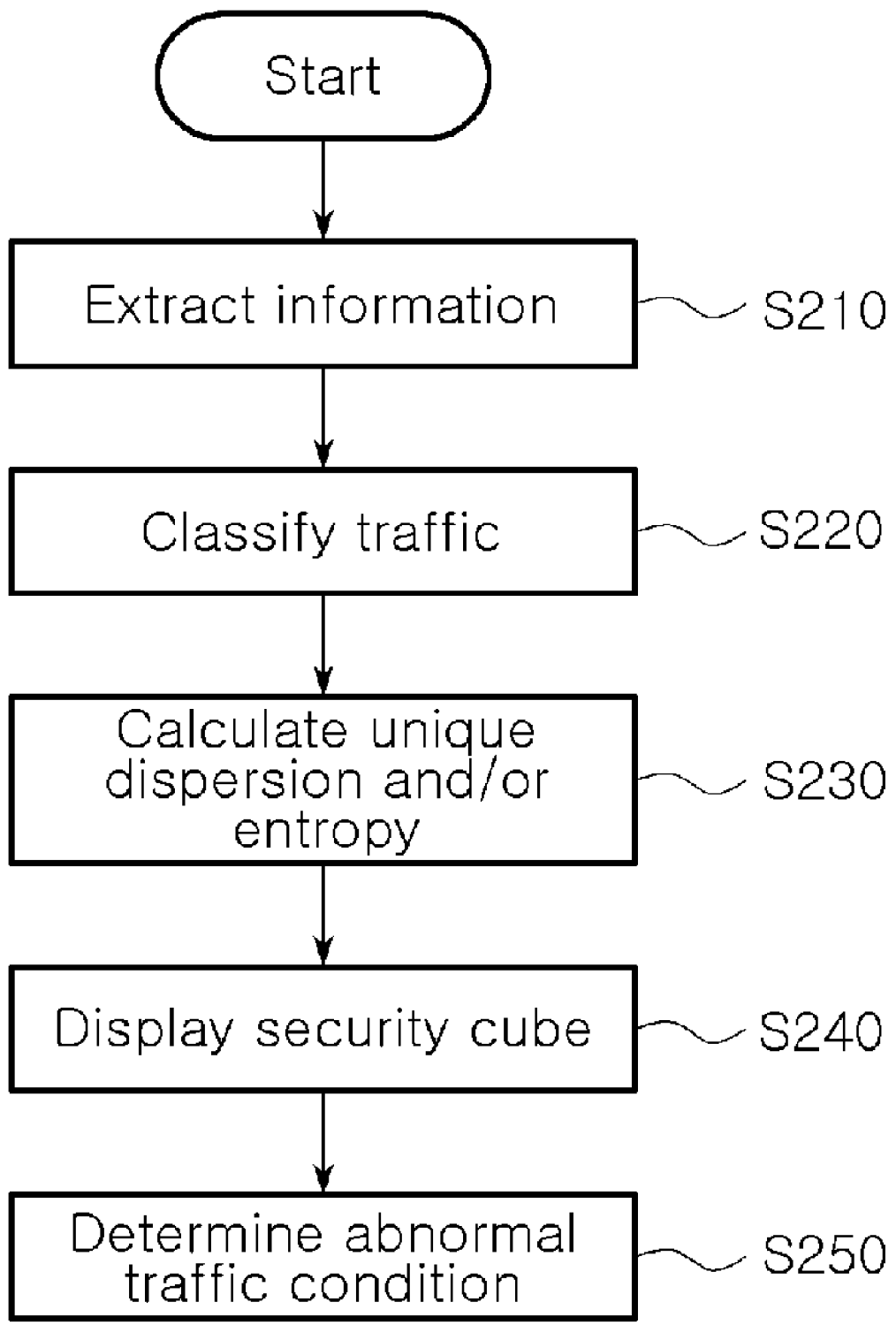
[Fig. 2]

[Fig. 3]
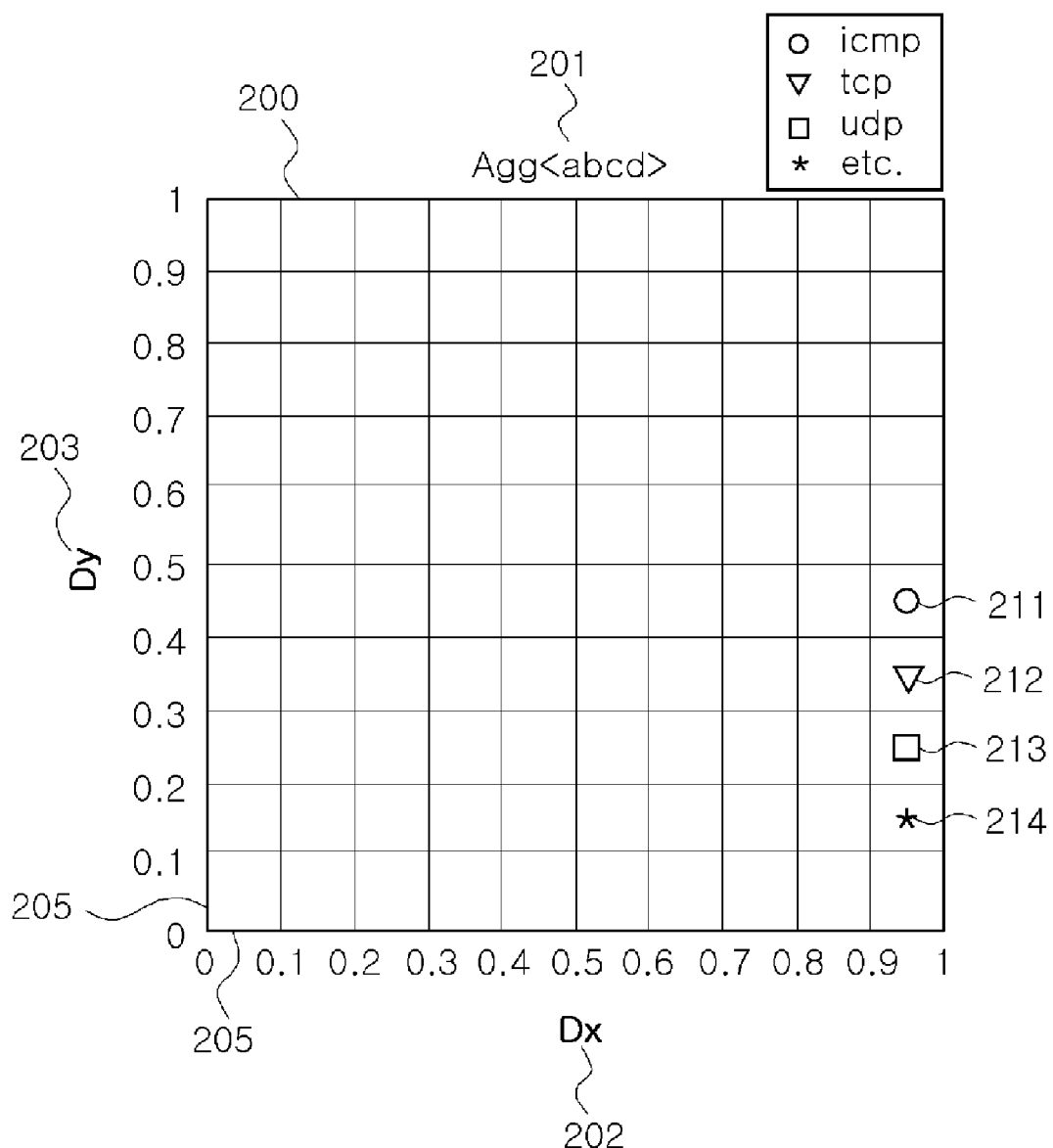

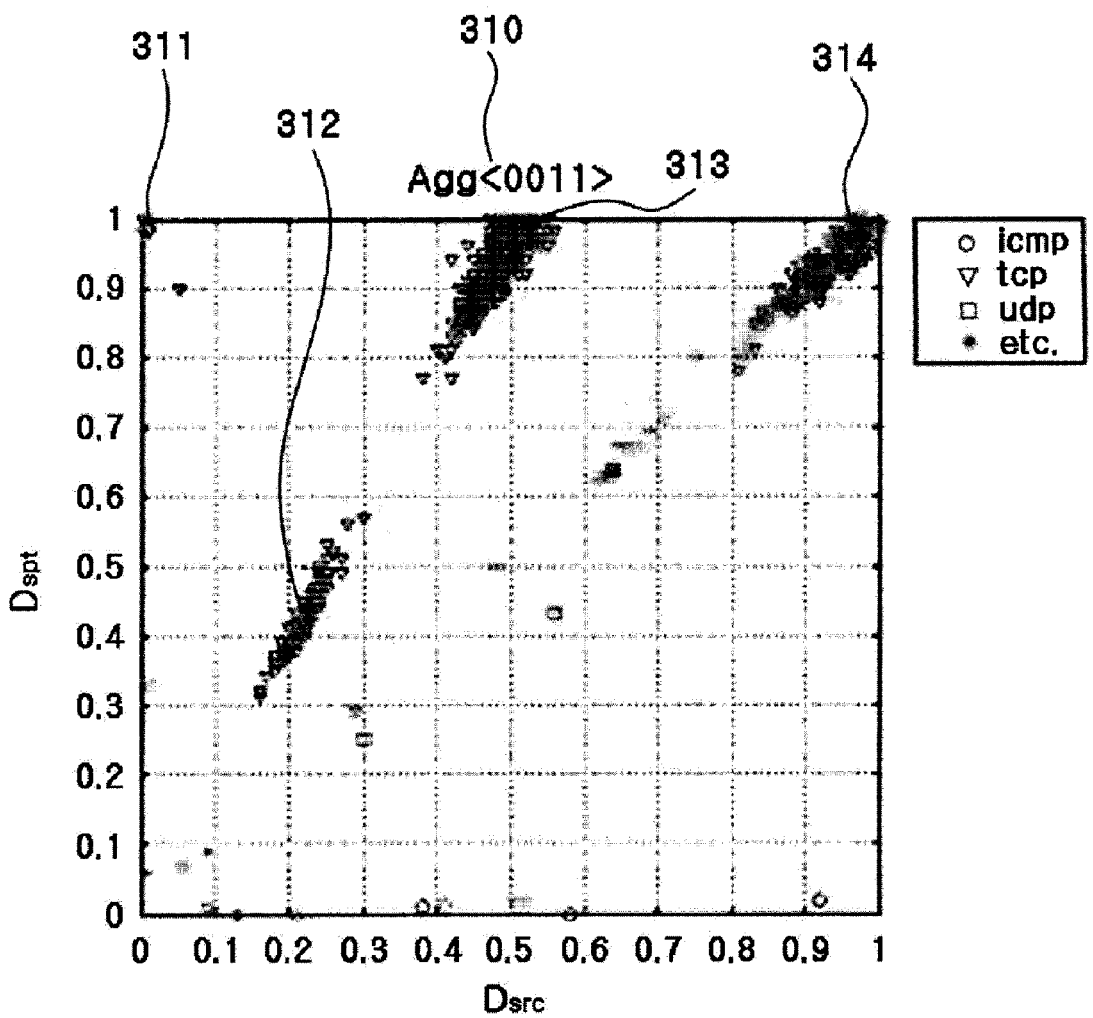

[Fig. 5]
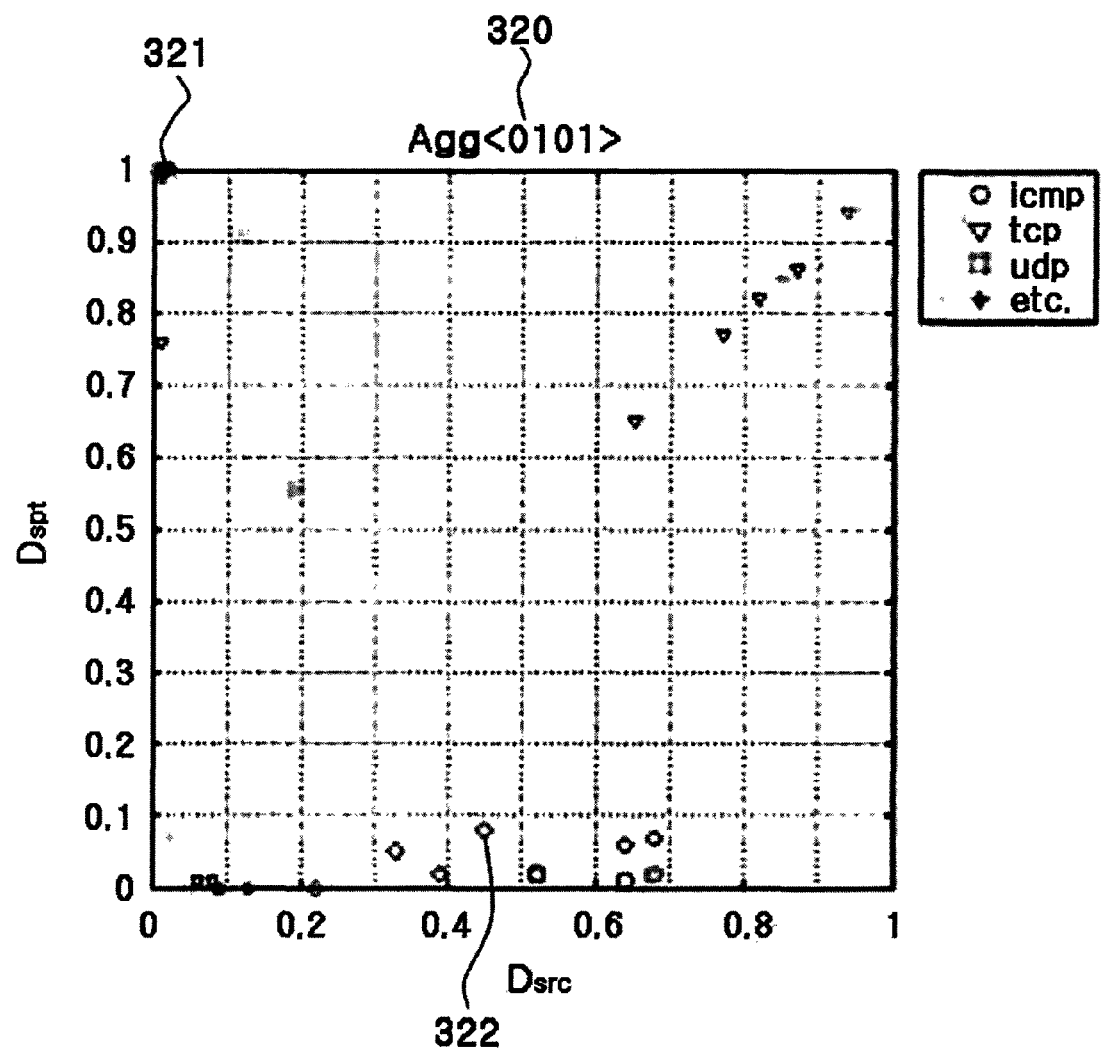

[Fig. 6]
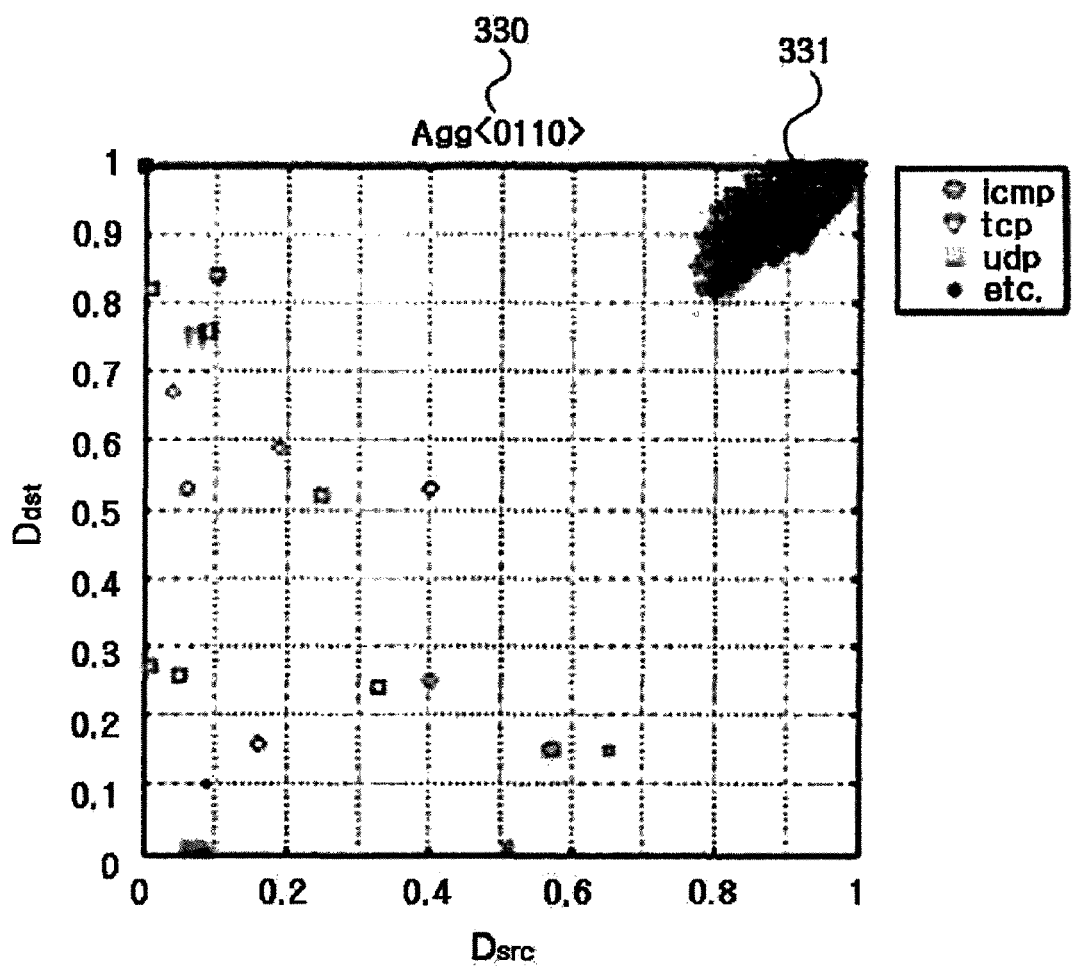

[Fig. 7]
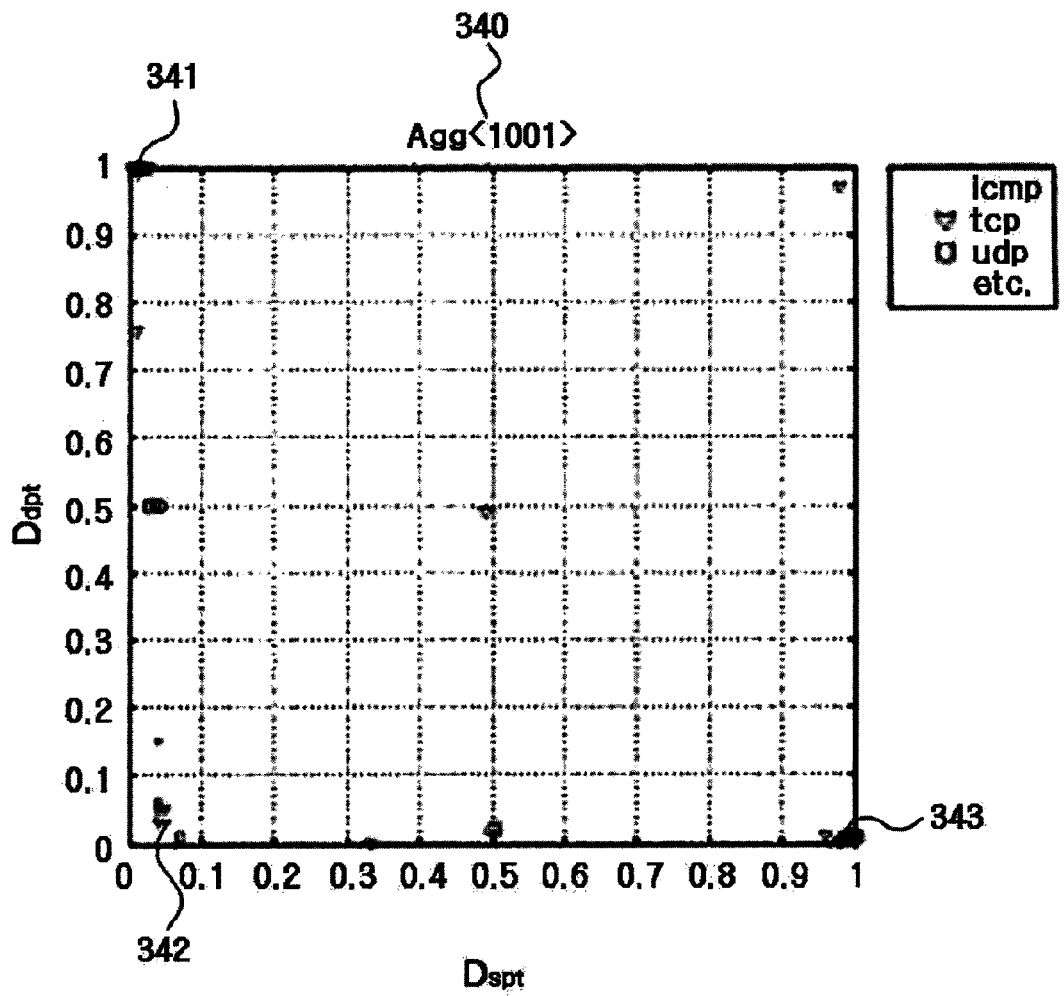

[Fig. 8]
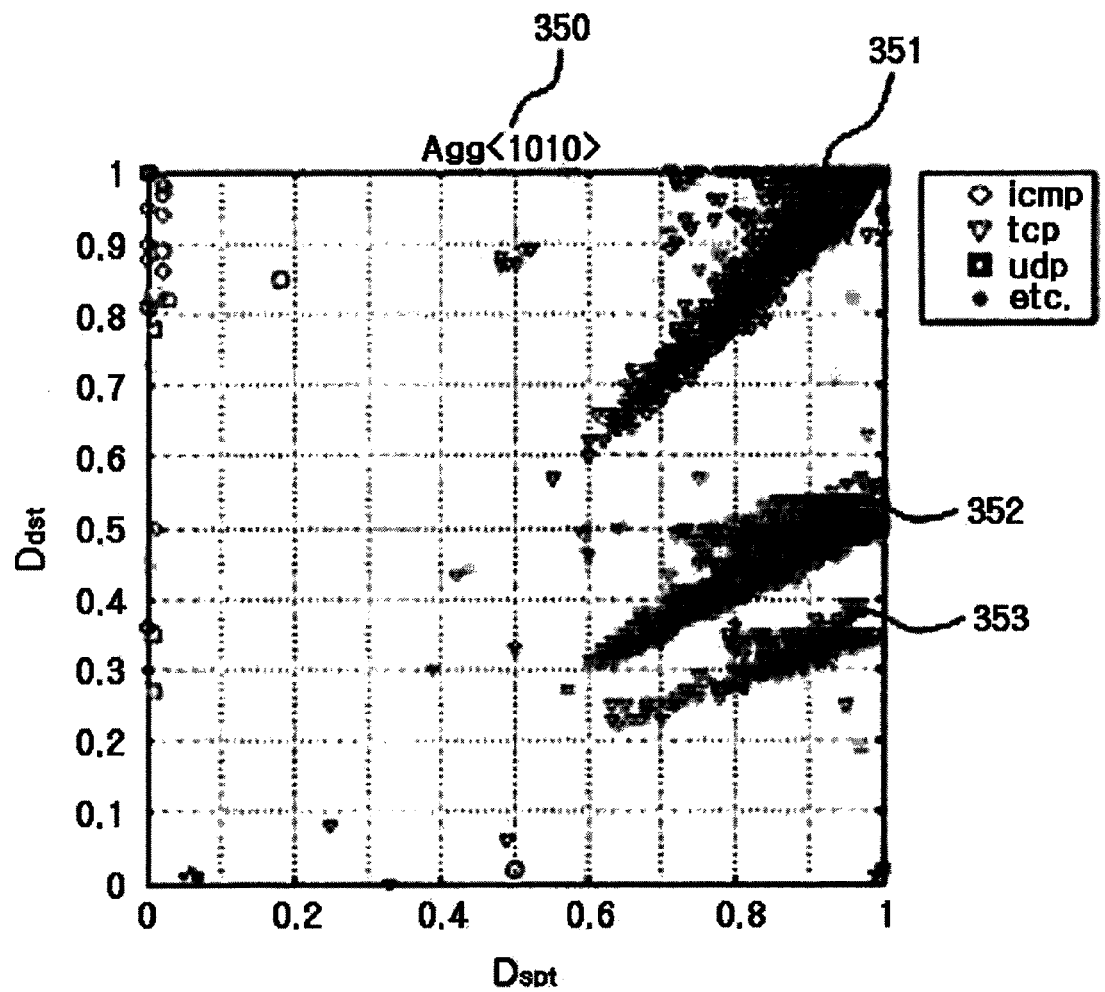

[Fig. 9]
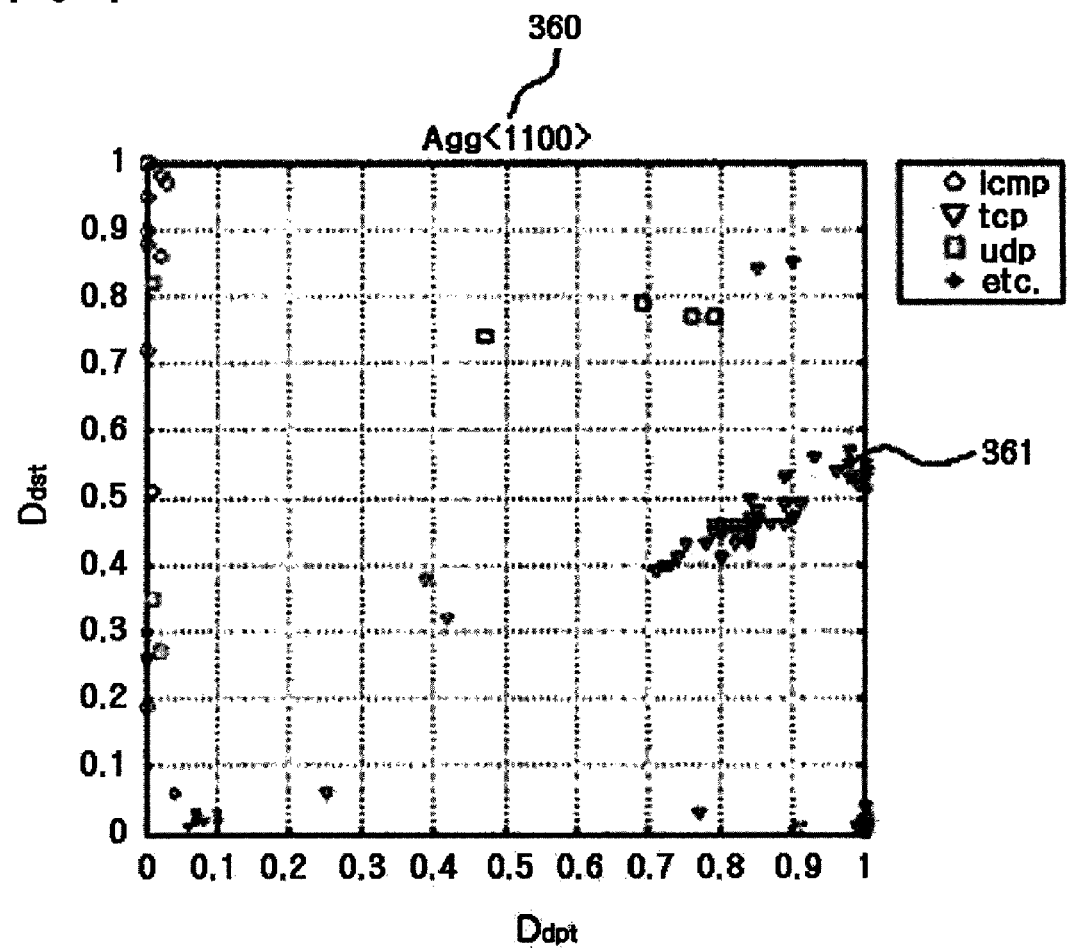

[Fig. 10]
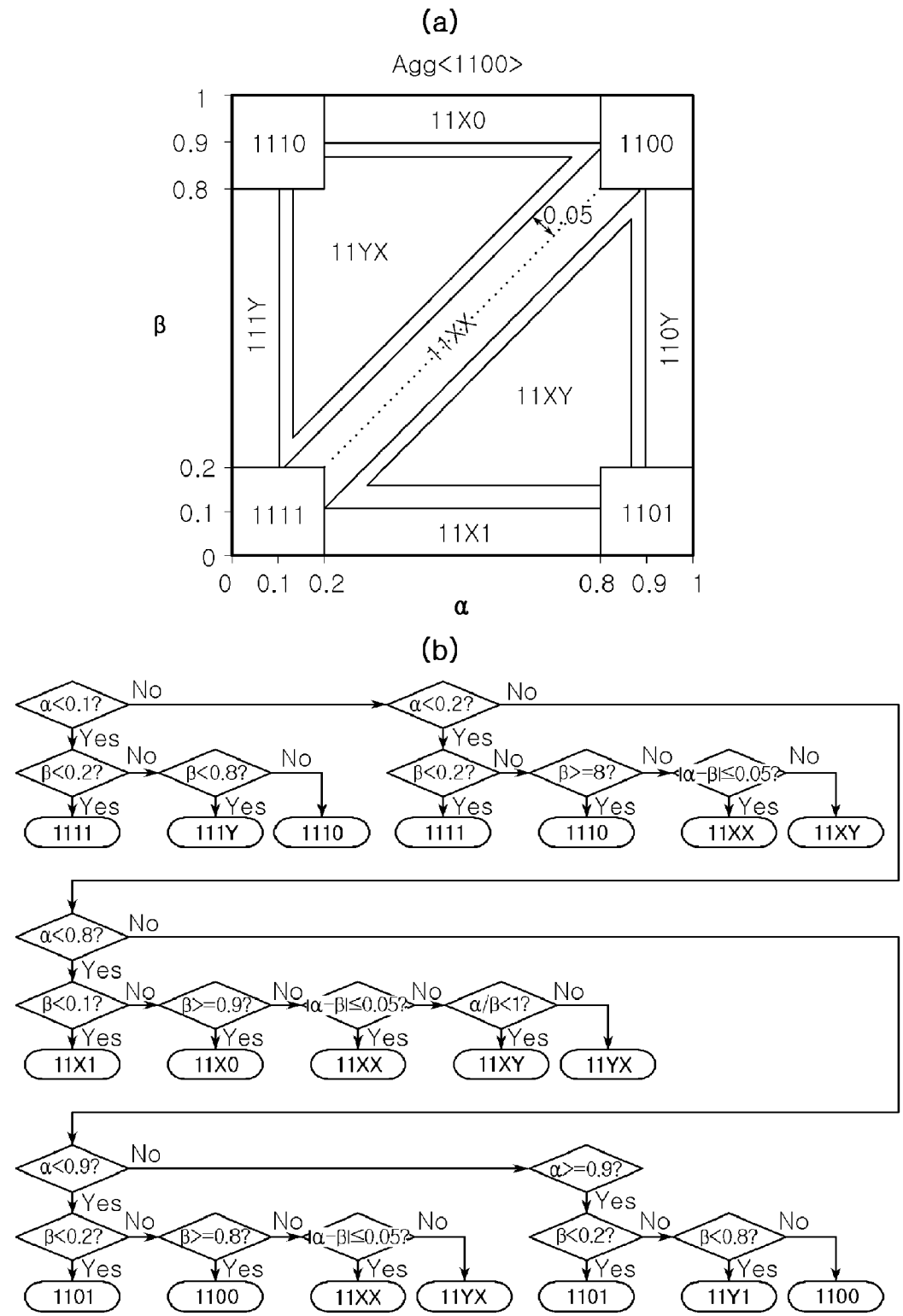

[Fig. 11]
(a) 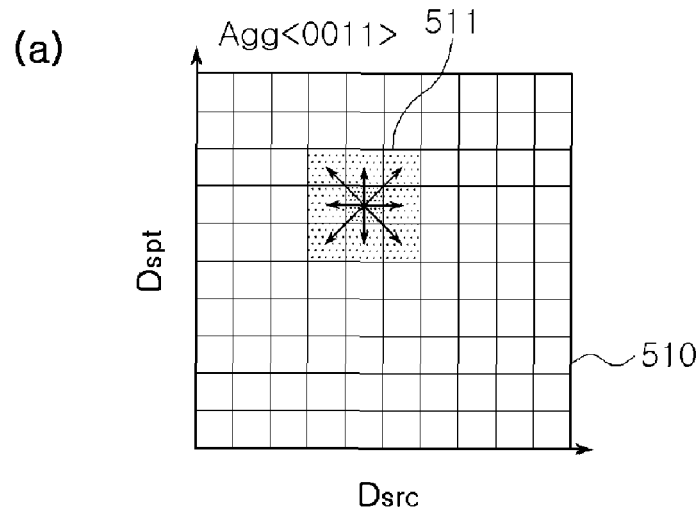
(b) 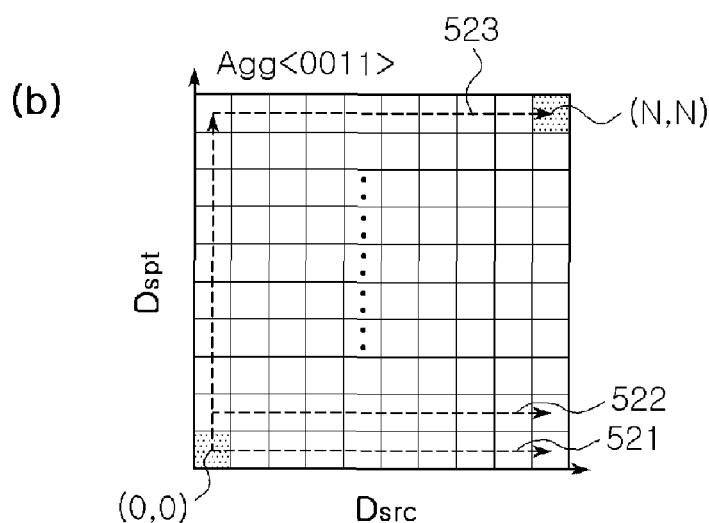
(c) 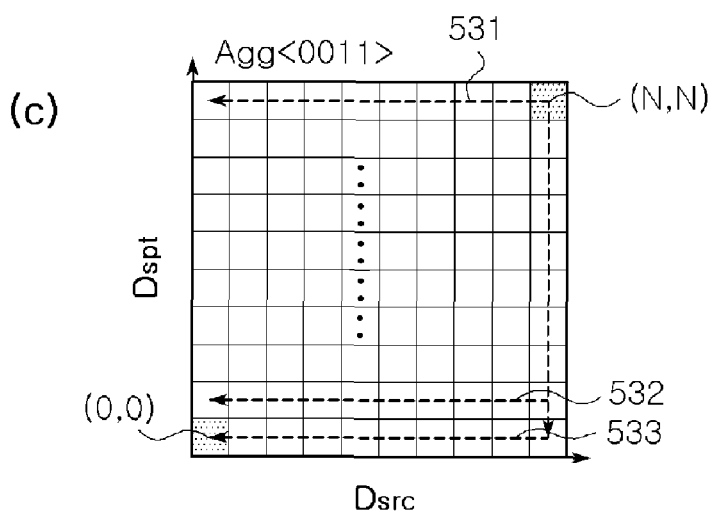

[Fig. 12]
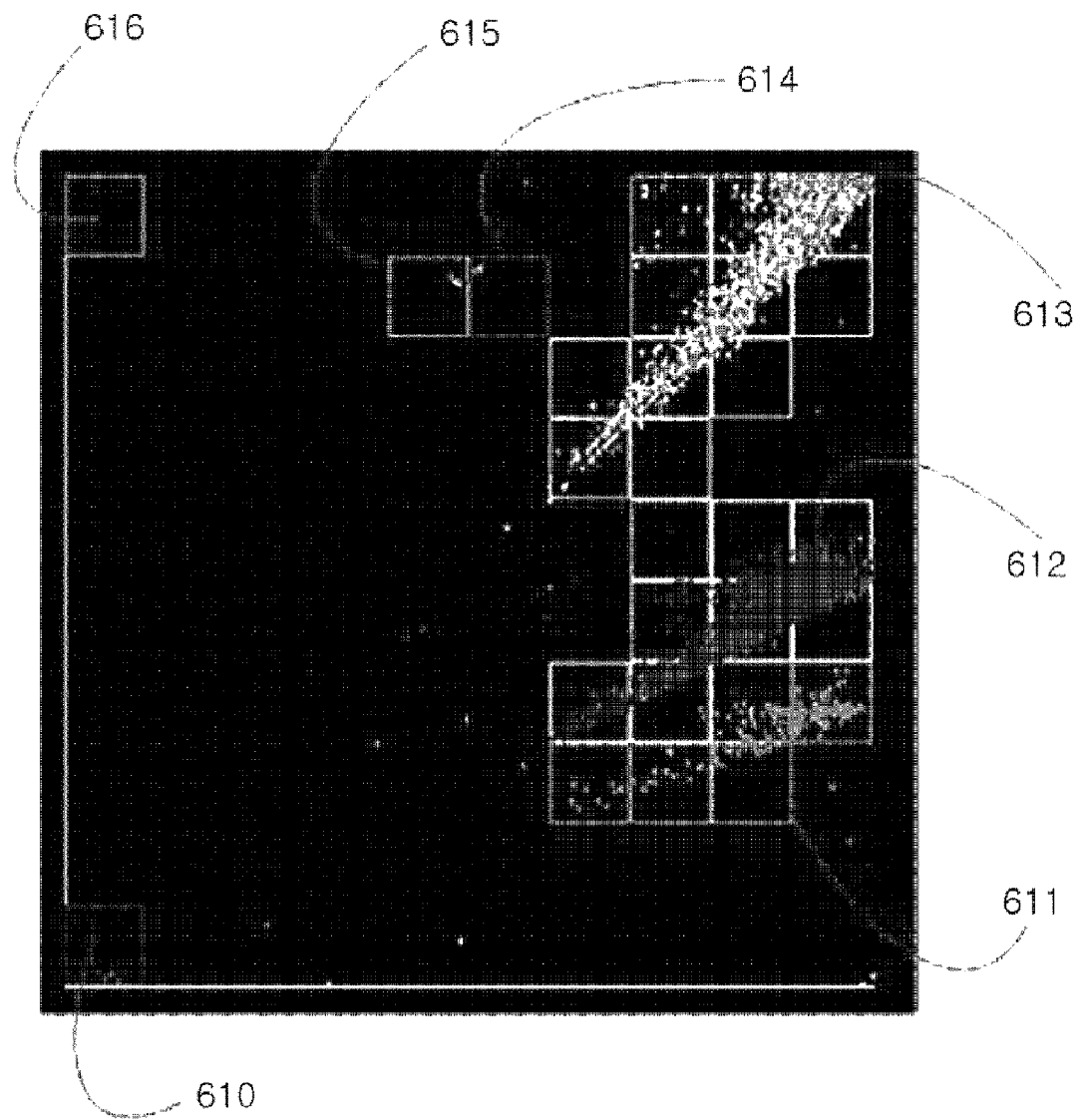

[Fig. 13]

```
ETC: 0.14 [20]
  139*[0.250] 1025*[0.250] 445*[0.200] 80*[0.200] 5000*[0.050] 119*[0.050]
Class[1]: (0.06, 0.01) 0.02 [3]
  119*[1.000]
Class[2]: (0.88, 0.33) 1.64 [233]
  445*[0.996] 1025*[0.004]
Class[3]: (0.88, 0.47) 16.58 [2348]
  1025*[0.903] 139*[0.095] 445*[0.002]
Class[4]: (0.93, 0.95) 81.21 [11503]
  5000*[0.181] 2745*[0.171] 80*[0.169] 6129*[0.167] 3127*[0.157] 1433*[0.153]
Class[5]: (0.48, 0.87) 0.02 [3]
  5000*[0.333] 2745*[0.333] 1433*[0.333]
Class[6]: (0.51, 0.88) 0.02 [3]
  80*[0.333] 6129*[0.333] 3127*[0.333]
Class[7]: (0.00, 1.00) 0.03 [4]
  3127*[0.250] 1080[0.250] 3126[0.250] 10080[0.250]
```

[Fig. 15]
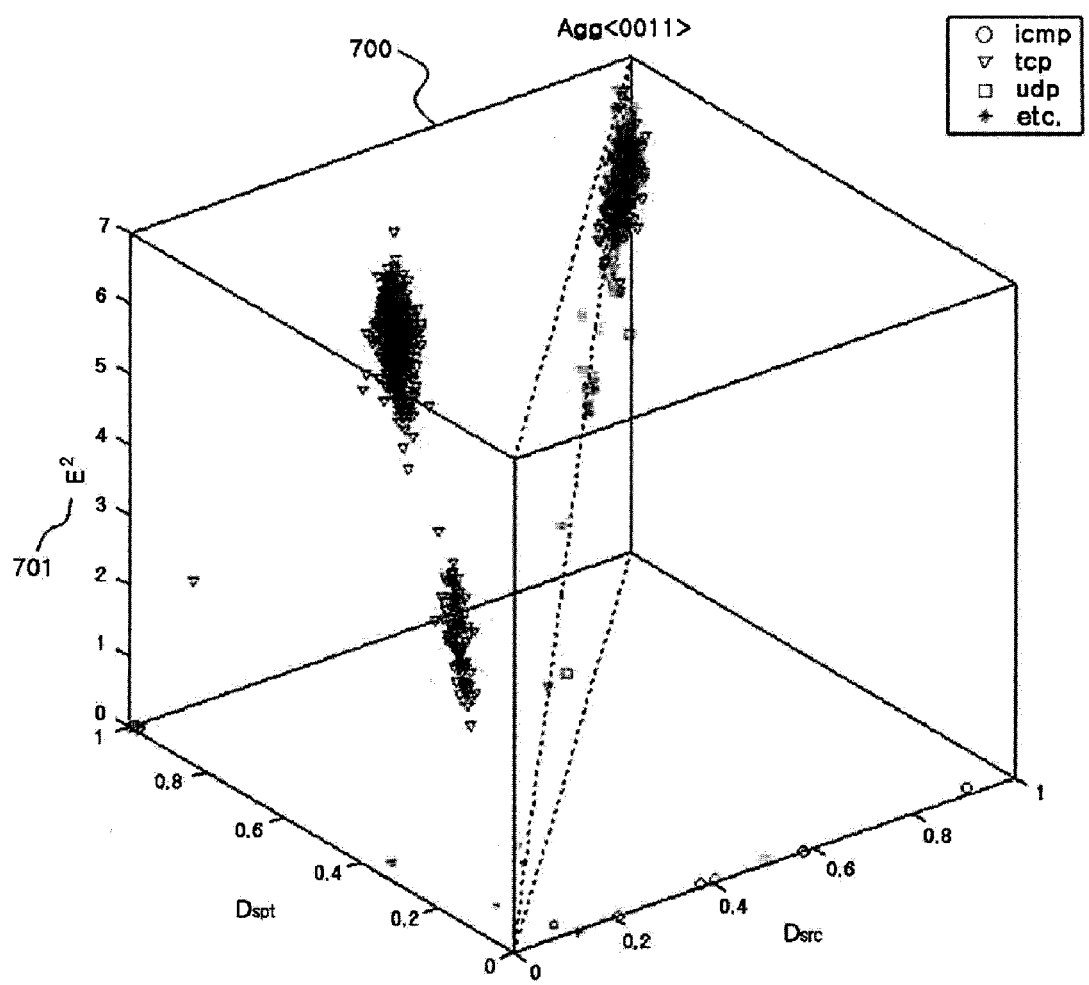

APPARATUS AND METHOD FOR VISUALIZING NETWORK SITUATION USING SECURITY CUBE

RELATED APPLICATIONS

This application is a 35 U.S.C. §371 national stage filing of PCT Application No. PCT/KR2007/004043 filed on Aug. 23, 2007, which claims priority to, and the benefit of, Korean Patent Application No. 10-2006-0117566 filed on Nov. 27, 2006. The contents of the aforementioned applications are hereby incorporated by reference.

TECHNICAL FIELD

The present invention relates to an apparatus and method for visualizing a network condition related to a network security; more particularly, to an apparatus and method for visualizing a network condition using a security cube which expresses an abnormal phenomenon in network traffic so as to allow a user to detect network attacks.

BACKGROUND ART

Conventionally, the abnormal condition of network traffic has been visualized and monitored by analyzing the variation of related features such as an address, a protocol, a port number, a packet number, or expressing related data of network condition as a coordinate plane or a geometry diagram according to a predetermined rule. Therefore, it is difficult to accurately discriminate or visualize a network condition made by a specific abnormal event or a specific type of attack. It is more difficult to detect an abnormal network condition created by new type of network attack. Furthermore, if a plurality of network attacks are in progress, some of them may be concealed by the others.

Also, conventionally visualized network condition images or graphs may show only an abnormal condition in network traffic, but does not accurately show a type of attack. Therefore, it is difficult to suggest a confront method for the detected network attack, and a manager may take a longer time to find harmful traffic causing the abnormal event and to deal with the detected abnormal event.

DISCLOSURE OF INVENTION

Technical Problem

An aspect of the invention is to provide an apparatus and method for visualizing network condition using a security cube in order to intuitively recognize a current network condition and dealing with the recognized current network condition in real time by analyzing abnormal and harmful traffics and network attack that reduce the network performance and displaying the result thereof.

Technical Solution

According to an aspect of the invention, the invention provides an apparatus for visualizing a network condition using a security cube including: a traffic feature extracting unit for extracting source address information, source port information, destination address information, and destination port information from network traffics, selecting two of the extracted information, and calculating unique dispersion degrees of two unselected information; a network condition displaying unit for displaying a two-dimensional cube expressed using the calculated unique dispersion degrees for the classified traffics; and a traffic abnormal condition determining unit for determining whether the traffics are in an abnormal condition or not based on the two-dimensional security cube.

The traffic feature extracting unit may calculate entropy values of two unselected information, and the network condition displaying unit may display a three-dimensional security cube expressed by the unique dispersion degrees and the entropy values.

According to another aspect of the invention, the invention provides a method for visualizing a network condition using a security cube including: extracting source address information, source port information, destination address information, and destination port information from network traffics, selecting two of the extracted information, and classifying the network traffics using the two selected information; calculating unique dispersion degrees of two unselected information among the extracted information for the classified traffics; displaying a two-dimensional security cube expressed with the calculated unique dispersion degrees; and determining whether the traffics are in an abnormal condition or not with reference to the security cube.

Advantageous Effects

According to the certain embodiment of the present invention, major features of network traffics are extracted, the network traffics are classified using two of the extracted features, unique dispersion degrees and/or entropy/compensation entropy are calculated using other two unselected features, and the calculated unique dispersion degrees and/or entropy/compensation entropy are expressed on a two-dimensional security cube or a three-dimensional security cube. The network conditions are displayed on the two-dimensional or the three-dimensional security cube with dots. The displayed dots are grouped to effectively express network information. Using the information expressed on the security cube, abnormal network conditions can be determined, and harmful traffic or abnormal traffic are detected. Also, the result of determining or detecting the abnormal network condition, the harmful traffic are reported to a security system or a manager automatically in order to confront such abnormal network conditions without requiring participating of a manager. That is, the abnormal condition of network can be quickly recognized and confront them by providing a network security cube that effectively visualizing the abnormal network condition, the harmful traffic or abnormal traffic.

BRIEF DESCRIPTION OF THE DRAWINGS

The above objects, other features and advantages of the present invention will become more apparent by describing the preferred embodiments thereof with reference to the accompanying drawings, in which:

FIG. 1 is a block diagram illustrating an apparatus for visualizing network condition using a security cube according to an exemplary embodiment of the present invention;

FIG. 2 is a flowchart illustrating a method of visualizing network condition using a security cube according to an exemplary embodiment of the present invention;

FIG. 3 is a diagram illustrating a two-dimensional security cube according to an embodiment of the present invention;

FIG. 4 to FIG. 9 shows two-dimension security cubs according to other embodiments of the present invention;

FIG. 10 (a) is a diagram illustrating a method of classifying abnormal network traffic in a two-dimensional security cube according to an exemplary embodiment of the present invention, and FIG. 10 (b) is a flowchart of the method of classifying abnormal network traffic of FIG. 10 (a);

FIG. 11 illustrates grouping of network traffics in a two-dimension security cube according to an embodiment of the present invention;

FIG. 12 to FIG. 14 illustrate analysis results according to an embodiment of the present invention; and FIG. 15 is a diagram illustrating a three-dimensional security cube 700 according to an embodiment of the present invention.

BEST MODE FOR CARRYING OUT THE INVENTION

Hereinafter, preferred embodiments of the present invention will be described in detail with reference to the attached drawings.

FIG. 1 is a block diagram illustrating an apparatus for visualizing network condition using a security cube according to an exemplary embodiment of the present invention. Referring to FIG. 1, the apparatus for visualizing network condition using a security cube according to the present embodiment includes a traffic feature extracting unit 110, a network condition displaying unit 120, and a traffic abnormal condition determining unit 130. The apparatus may further include a traffic information storing unit 101.

The traffic feature extracting unit 110 includes a traffic feature extracting module 111 for extracting source address information, source port information, destination address information, and destination port information, selecting two of the extracted information, and classifying the network traffic based on the selected two extracted information, and a feature value calculating module 112 for calculating unique dispersion degrees of two selected information for the classified network traffics. Then, the traffic feature extracting unit 110 transfers the extracted information, the classification information and the calculated dispersion degrees to the network condition displaying unit 120. The classification information may be one of <source address, source port>, <source address, destination address>, <source address, destination port>, <source port, destination port>, <source port, destination address>, and <destination port, destination address>.

The traffic feature extracting module 111 can extract the information after dividing network traffics by a protocol. In this case, it is preferable to transfer protocol information to the network condition displaying unit 120 to display the protocol information. The traffic feature extracting module 111 can be controlled to extract information from the network traffic if the number of traffics having the same source address and the same destination address is larger than a predetermined number.

The traffic feature extracting module 111 also calculates entropy values and/or compensation entropy values of two unselected information when the dispersion degrees are calculated. The compensating entropy values are less sensitive to the traffic variation comparing to the entropy value. In this case, it is preferable to transfer the calculated entropy values and/or compensation entropy values to the network condition displaying unit 120. A method of calculating the entropy value and/or the compensation entropy value will be described in later. Furthermore, the extracted information, the classification information, and the calculated values can be stored in the traffic information storing unit 101.

The network condition displaying unit 120 displays information transferred from the traffic feature extracting unit 110 at a security cube. In order to display the information, the network condition displaying unit 120 includes a two-dimensional security cube displaying module 121, and a three-dimensional security cube displaying module 131. The two-dimensional security cube displaying module 121 displays the classification information and the calculated dispersion degrees from the traffic feature extracting unit 110 at the security cube. That is, each of the calculated dispersion degrees becomes coordinate values of X axis and Y axis. The three-dimensional security cube displaying module 122 express the dispersion degrees like as the two-dimensional security cube, and further displays the entropy values and/or the compensation entropy values of classified traffics on a Z axis.

The network conditional displaying unit 120 displays the network conditions using dots in different sizes, shapes, and colors according to the classified network traffics and the port numbers. Also, the network conditional displaying unit 120 displays the network conditions using dots in different sizes, shapes, and colors according to the calculated entropy values and/or compensation entropy values. Such a way of displaying the network conditions may help a user to easily and quickly understand the contents of the security cube.

The traffic abnormal condition determining unit 130 determines whether predetermined network traffics are in an abnormal condition or not based on the security cube, and detects harmful traffic or abnormal traffic which causes the abnormal network condition. In order to perform such an operation, the traffic abnormal condition determining unit 130 includes a traffic grouping module 131 for grouping information on a security cube and visualizing the grouped information for conveniently analyzing information on the security cube and easily understanding network conditions. For example, the traffic grouping module 131 sectors the two-dimensional and/or three-dimensional security cube by the predetermined number of lattices, compares the similarity between a predetermined lattice and adjacent lattices, and determines that the predetermined lattice is in the same group of the adjacent lattices if the similarity thereof is larger than a predetermined value.

The traffic abnormal condition determining unit 130 may further include an abnormal condition determining module 132 for determining the generation of abnormal condition in network traffics. For example, the traffic abnormal condition determining module 132 determines whether predetermined network traffic is in an abnormal condition or not using at least one of information including a port list per a protocol of a predetermined group, frequency per a port, a rate per a port for entire data, and a location and an area of a group in a security cube.

The traffic abnormal condition determining unit 130 sectors the security cube into the predetermined number of areas and classifies traffic in a predetermined area as a traffic having the feature related to the area, thereby determining whether the traffic is in an abnormal condition or not. If the traffic abnormal condition determining unit 130 determines that predetermined network traffic is the abnormal condition, the traffic abnormal condition determining unit 130 detects the harmful traffic or the abnormal traffic that causes the abnormal network condition and reports the detected harmful traffic or abnormal traffic to a security system or a manager.

FIG. 2 is a flowchart illustrating a method of visualizing network condition using a security cube according to an exemplary embodiment of the present invention. Referring to FIG. 2, at step S210, source address information, source port information, destination address information, and destination port information are extracted from network traffics. Then, two information are selected from the extracted information, and the network traffics are classified based on the two selected information at step S220. Then, unique dispersion degrees for two unselected information among the extracted information are calculated for the classified traffic at step S230. At the step S230, entropy values and/or compensation entropy values of the two unselected information can be calculated. The method of calculating the entropy value and/or compensation entropy value will be described later.

Then, a two-dimensional security cube is displayed with the calculated unique dispersion degrees and a three-dimensional security cube is displayed with the calculated entropy value and/or the compensation entropy values according to predetermined settings at step S240. Referring to the security cube, it determines whether the network traffic is in an abnormal condition or not at step S250. In case of the abnormal condition, it informs the manager or the security system of the abnormal condition in order to perform necessary operations for confronting such an abnormal condition.

FIG. 3 is a diagram illustrating a two-dimensional security cube 200 according to an embodiment of the present invention. Referring to FIG. 3, in a two-dimensional security cube 200, a title 201 denotes features used to classify network traffics, such as a source address, a source port, a destination port, and a destination address. The four features are extracted from network traffic. Then, two features are selected from the four extracted features, and the network traffics are classified based on the two selected features. Then, the unique dispersion degrees Dx 202 and Dy 203 of the unselected features are calculated, thereby displaying the two-dimensional security cube 200. For example, anti-grain geometry (Agg) 1100 201 denotes a two-dimensional security cube expressed by classifying network traffic using a source address and a source port and calculating unique dispersion degrees of a destination port and a destination address.

Math FIG. 1 shows an equation for calculating a unique dispersion degree.

MathFigure 1

$$Dw = \frac{\text{Distinct}(w)}{n(\text{event})} \quad [\text{Math. 1}]$$

$w = \{\text{source address, source port,}$
$\text{destination port, destination address}\}$ w={source address, source port, destination port, destination address}

In math figure 1, n(event) denotes the number of classified network traffics, and Distinct(w) denotes the number of independent features when the features of w are extracted from the entire network traffics and arranged. Herein, the overlapped features are not included in the number of features. For example, when w={21, 23, 53, 53, 80, 80}, Distinct(w) is 4. In more specific, in a two-dimensional security cube of Agg<1100>, n(event) denotes the sum of the number of traffics classified by the source address and a source port. Herein, the unique dispersion degree Dx of a destination port is the number of independent destination ports/the total number of classified network traffics, and the unique dispersion degree Dy of a destination address is the number of independent destination addresses/the total number of classified network traffic. The unique dispersion degree Dx of a destination port and the unique dispersion degree Dy of a destination address are expressed by dots 211, 212, 213, and 214 with a predetermined sign 204.

Through such calculated coordinates on an X axis and a Y axis in a two-dimensional security cube, the same type of network attack is expressed on the two-dimensional security cube.

The security cube is an example of visualizing network traffic classified by a protocol. Herein, each sign denotes an interne control message protocol (ICMP), a transmission control protocol (TCP), a user datagram protocol (UDP), and etc. The shapes of the signs can vary in other embodiments.

Such dots can be displayed in different sizes, shapes, and colors in order to allow a user to clearly discriminate one from others and to easily understand information on the security cube. For example, if port numbers are provided with 0 to 65535 assigned and the network traffic is visualized on the two-dimensional security cube using unique dispersion degrees of port numbers, destination ports (dpt) can be displayed with appropriately assigned 65535 colors according to a source port (spt) to clearly discriminate one from others, or by assigning specific colors to ports satisfying a predetermined condition.

FIG. 4 to FIG. 9 shows two-dimension security cubs 310, 320, 330, 340, 350, and 360 according to other embodiments of the present invention. In FIG. 4 to FIG. 9, Dsrc, Dspt, Ddpt, and Ddst denote the unique dispersion degree of a source address, the unique dispersion degree of a source port, the unique dispersion degree of a destination port, and the unique dispersion degree of a destination address, respectively.

FIG. 4 shows a two-dimensional security cube 310 visualized by classifying network traffics by a destination port and a destination address, calculating unique dispersion degrees of the source address and the source port as shown in Agg<0011>. When the port numbers have 0 to 65535, the two-dimensional security cube 310 shows a network attack 311 made to a web server (destination port: 80) of a TCP, network attacks 312 and 313 made to a remote procedure call/a local security authority (RPC/LSA) (destination port: 1025), and an abnormal network condition 314 (destination ports: 80, 1433, 2745, 3127, 5000, and 6129.

FIG. 5 shows a two-dimensional security cube 320 visualized by classifying network traffics by a source port and a destination address and calculating unique dispersion degrees of a source address and a destination port. In FIG. 5, the two-dimensional security cube shows a damage 321 of a web server (destination port: 80) of TCP and an abnormal condition 322 of an ICMP.

FIG. 6 shows a two-dimensional security cube 330 visualized by classifying network traffic by a source port and a destination port and calculating unique dispersion degrees of a source address and a destination address. In FIG. 6, the two-dimensional security cube expresses abnormal traffic (destination ports: 80, 1025, 2745, 3127, 5000, and 6129) caused by warm or spam.

FIG. 7 shows a two-dimensional security cube 340 visualized by classifying network traffic by a source address and a destination address and calculating unique dispersion degrees of a source port and a destination port. In FIG. 7, the two-dimensional security cube expresses attacking and damages 341, 342, and 343 of TCP/UDP.

FIG. 8 shows a two-dimensional security cube 350 visualized by classifying network traffic by a source address and a destination port and calculating unique dispersion degrees of a source port and a destination address. In FIG. 8, the two-dimensional security cube expresses abnormal traffics 351 (destination ports: 80, 1433, 2745, 3127, 5000, 6129) caused by warm or spam, abnormal traffics 352 (destination ports: 139, 445, 1025), and abnormal traffics 353 (destination port: 445, 1025).

FIG. 9 shows a two-dimensional security cube 360 visualized by classifying network traffic by a source address and a source port and calculating unique dispersion degrees of a destination address and a destination port. In FIG. 9, the two-dimensional security cube expresses abnormal traffic 361 (destination ports: 80, 1025, 2745, 3127, 5000, and 6129).

FIGS. 10 (*a*) and (*b*) are a diagram and a flowchart illustrating a method of identifying abnormal network traffic in a two-dimensional security cube according to an exemplary embodiment of the present invention. FIG. 10 (*a*) is a diagram illustrating a two-dimensional security cube with sectored areas for classifying abnormal traffic based on a location thereof. Referring to FIG. 10 (*a*), for example, at first, two-dimensional security cube is sectored into 11 areas, and if traffic data is present in a pre-defined area, the traffic data is classified as a traffic having the feature of the predefined area. That is, a traffic belonging to a predetermined area is defined as a traffic having the feature of the predetermined area. If traffic is expressed or determined as belonged to the predetermined area of the security cube, it determines that the traffic is abnormal traffic. FIG. 10 (*a*) shows a security cube with divided areas for Agg<1100>.

FIG. 10 (*b*) is a flowchart illustrating a method of classifying an abnormal traffic based on the areas of a security cube, which are sectored like as FIG. 10 (*a*). In FIG. 10 (*b*), in order to classify an abnormal traffic, it determines where an abnormal traffic is based on the value of X axis. Than, the area of the abnormal traffic is finally determined using the value of Y axis. In FIGS. 10 (*a*) and (*b*), α denotes unique dispersion degree value of a destination port, β is a unique dispersion degree value of a destination address. If the value of α is smaller than 0.1 and the value of β is smaller than 0.2, it determines that a traffic is belonging to an area 1111. If the value of α is smaller than 0.1 and the value of β is equal to or larger than 0.2, it determines that a traffic is belonging to an area 111Y. If the value of α is smaller than 0.1 and the value of β is larger than 0.8, it determines that a traffic is belonging to an area 1110. According to such an scheme, traffics belonging to each area are defined, the traffics are classified into traffics having corresponding characteristics of areas. This method has advantages of quick classification, but has a limitation of seriously influencing the abnormal traffic classification result by a pre-defined area.

FIG. 11 illustrates grouping of network traffics in a two-dimension security cube according to an embodiment of the present invention. A diagram a) in FIG. 11 shows a two-dimensional security cube 510 divided by N×N lattices for grouping network traffics. In the two-dimensional security cube 510, an area 511 shows comparing a similarity of a predetermined lattice with that of adjacent eight lattices. Such a comparison operation uses following math figure 2.

MathFigure 2

$$s(x, y) = \sum_{i=1}^{k} \sum_{j=0}^{l} w_{ixy} f(c_{ijx}, v_{ijx}, c_{ijy}, v_{ijy})$$

[Math. 2]

A similarity s(x,y) between a predetermined lattice x and adjacent lattices y, for example, can be decided by multiplying values of functions with parameters such as a weight $w_{ixy}$ for k protocols, a ratio of a frequency $C_{ijz}$, and $C_{ijy}$ of $i^{th}$ protocol of $j^{th}$ port present in a lattice and a entire frequency.

If the similarity of lattices is larger than a predetermined threshold, it is determined as the same group. If not, it is determined as other group.

Referring to diagrams b) and c) in FIG. 11, the grouping is performing by comparing a predetermined lattice x with adjacent lattices in arrow directions 521, 522, and 523 that starts from a point (0,0) to a point (N,N), or in arrow directions 531, 532, and 533 starts a point (N,N) to a point (0,0). Information such as a port list per each protocol, a frequency per a port, a rate per a port for entire data, a location and area of a group in a two-dimensional security cube are extracted from the group determined as the same group through the grouping operation. The extracted information is used to determined abnormal traffic condition.

FIG. 12 to FIG. 14 illustrate analysis results according to exemplary embodiments of the present invention. The grouping result, for example, can be visualized in the two-dimensional security cube as like FIG. 12. Also, the grouping result and the characteristics of each group can be shown as texts as like FIG. 13. Furthermore, the analysis results can be shown by expressing port information of each group based on ports in the security cube as like FIG. 14.

In FIG. 12, rectangles with the same color in a two-dimensional security cube denote network traffics that are determined as one group. The two-dimensional security cube displays seven groups 611, 612, 613, 614, 615, and 616.

FIG. 13 is a diagram illustrating an example of displaying the feature of each group as texts. Referring to the third line 621 and the fourth line 622, [0.06, 0.01] in the third line 621 denotes a center of a group, '0.02' denotes a rate of data forming a group versus an entire data, '[3]' denotes the number of group data. Also, in the fourth line 622, '119' denotes a port of data forming the group, '[1.000]' denotes a rate of occupying a group by data using a corresponding port. '★' between '119' and '[1.000]' denotes information whether a predetermined port is belonging to other groups or not.

FIG. 14 illustrates port information in each group. Referring to the first line 631 of FIG. 14, '1025' denotes a port number, '[4]' denotes the number of groups having the port, '0151' denotes a rate of data using the port versus the entire data. '[2138]' denotes the number of data having the port. The remained part denotes information about the number of data using a predetermine port in each group.

FIG. 15 is a diagram illustrating a three-dimensional security cube 700 according to an embodiment of the present invention. That is, FIG. 15 shows two-dimensional security cube in FIG. 4 in the three-dimensional security cube. In FIG. 15, the X axis and the Y axis of the three-dimensional security cube 700 are expressed like as the two-dimensional security cube. Hereinafter, a Z axis of the three-dimensional security cube will be described. The values of Z axis can be expressed using entropy value or compensation entropy value calculated from math figure 3.

MathFigure 3

$$H = -\sum_{i=1}^{n} p_i \log_2 P_i,$$

[Math. 3]

$$E = H \times \sqrt{\frac{dn}{n}}$$

In math figure 3, H denotes an entropy value, E denotes a compensation entropy value, $p_i$ denotes a probability of having i outputted from a mother set, n denotes flow_count, and a dn denotes distinct flow_count.

That is, $p_i$ is a probability of network traffics having the same two remained information after network traffics are classified using two of source address information, source port information, destination port information, and destination address information, which are extracted from the network traffics. n denotes the number of the entire classified network traffics, and dn denotes the number of network traffics excluding overlapped network traffics. According to the shown method, the compensation entropy value is less sensitive to the number of network traffics compared to the entropy value H. Such entropy values and compensation entropy values are used to express the Z axis of the three-dimensional security cube.

Referring to FIG. 15, the Z axis is expressed by squaring of the compensation entropy values. The $E^2$ denotes the result of multiplying two feature values, which are not used to classify the network traffics, or squaring of the compensation entropy value. In the three-dimensional security cube, coordinates of X axis and Y axis are calculated using unique dispersion degree of two features with a two-dimensional security cube. The coordinate is used to express the same type of attacking on a security cube. The $E^2$ of the Z axis denotes the amount of network attacking. That is, if the values of $E^2$ are equal, it denotes the same number of attacks tried or the same amount of network attack tried. It also means that there is a large probability of the same attacker. The greater the value $E^2$ is, the higher the risk is shown. In order to effectively and clearly display such risk levels, dots displayed according to the calculated entropy values can be displayed in different sizes, shapes, and colors.

Although the preferred embodiments of the present invention have been disclosed for illustrative purpose, those skilled in the art will appreciate that various modifications, additions and substitutions can be made without departing from the scope and spirit of the invention as defined in the accompanying claims.

INDUSTRIAL APPLICABILITY

An aspect of the invention is to provide an apparatus and method for visualizing network condition using a security cube in order to intuitively recognize a current network condition and dealing with the recognized current network condition in real time by analyzing abnormal and harmful traffics and network attack that reduce the network performance and displaying the result thereof.

The invention claimed is:

1. An apparatus for visualizing a network condition using a security cube comprising:
   a traffic feature extracting unit for extracting source address information, source port information, destination address information, and destination port information from network traffics, selecting two of the extracted information, and calculating unique dispersion degrees of two unselected information;
   a network condition displaying unit for displaying a two-dimensional cube expressed using the calculated unique dispersion degrees for classified traffics; and
   a traffic abnormal condition determining unit for determining whether the traffics are in an abnormal condition or not based on the two-dimensional security cube.

2. The apparatus according to claim 1, wherein the traffic feature extracting unit calculates entropy values of the unselected two information, and the network condition displaying unit displays a three-dimensional security cube expressed by the unique dispersion degrees and the entropy values.

3. The apparatus according to claim 2, wherein the entropy values used to display the three-dimensional security cube are compensation entropy values compensated to be less sensitive to traffic variation.

4. The apparatus according to claim 2, wherein the network condition displaying unit displays dots in different size, shapes, and colors according to the calculated entropy values.

5. The apparatus according to claim 1, further comprising a traffic information storing unit for storing the extracted and calculated information from the traffic feature extracting unit.

6. The apparatus according to claim 1, wherein the traffic feature extracting unit extracts information from the network traffics after dividing the network traffics by a protocol.

7. The apparatus according to claim 6, wherein the network condition displaying unit displays dots in different sizes, shapes, and colors according to a protocol and a port number of the classified network traffic.

8. The apparatus according to claim 1, wherein the traffic feature extracting unit extracts information from the network traffics only if the number of traffics having the same source address and the same destination address is larger than a predetermined value.

9. The apparatus according to claim 1, wherein the traffic abnormal condition determining unit includes a traffic grouping module for grouping information displayed on the security cube and displaying feature information of each group on the security cube.

10. The apparatus according to claim 9, wherein the traffic abnormal condition determining unit further includes a traffic abnormal condition determining module for monitoring the group whether or not the group is in an abnormal condition, and reporting the abnormal condition of the group if the group is in the abnormal condition.

11. The apparatus according to claim 9, wherein the traffic abnormal condition determining unit sectors the security cube by a predetermined number of lattices, compares similarity between a predetermined lattice and adjacent lattices, and determines that the predetermined lattice and the adjacent lattices are in a same group if the similarity thereof is larger than a predetermined value.

12. The apparatus according to claim 9, wherein the traffic abnormal condition determining module determines abnormal traffic using one of information including a port list per a protocol of a predetermined group, frequency per a port, a rate per a port for entire data, and a location and area of a group in a security cube.

13. The apparatus according to claim 1, wherein the traffic abnormal determining unit sectors the security cube into a predetermined number of areas, and classifies traffics in a predetermined area as a traffic having a feature of the area.

14. A method for visualizing a network condition using a security cube comprising:
   extracting source address information, source port information, destination address information, and destination port information from network traffics, selecting two of the extracted information, and classifying the network traffics using the two selected information;
   calculating unique dispersion degrees of two unselected information among the extracted information for classified traffics;
   displaying a two-dimensional security cube expressed with the calculated unique dispersion degrees; and
   determining whether the traffics are in an abnormal condition or not with reference to the security cube.

15. The method according to claim 14, wherein in the step of calculating unique dispersion degrees, entropy values of two unselected information are calculated, and in the step of displaying the security cube, a three-dimensional security cube expressed by the unique dispersion degrees and the entropy values are displayed.

16. The method according to claim 15, wherein the entropy values used to display the three-dimensional security cube are compensation entropy values compensated to be less sensitive to traffic variation.

17. The method according to claim 15, wherein in the step of displaying the security cube, dots are displayed in different size, shapes, and colors according to the calculated entropy values.

18. The method according to claim 14, further comprising storing the extracted and calculated information after the step of calculating unique dispersion degrees.

19. The method according to claim 14, wherein in the step of calculating unique dispersion degrees, information are extracted from the network traffics after dividing the network traffics by a protocol.

20. The method according to claim 14, wherein in the step of classifying network traffic, information is extracted from the network traffics only if the number of traffics having the same source address and the same destination address is larger than a predetermined value, and the network traffics are classified based on the extracted information.

21. The method according to claim 14, wherein in the step of displaying the security cube, dots are displayed in different sizes, shapes, and colors according to a protocol and a port number of the classified network traffic.

22. The method according to claim 14, further comprising, before the step of determining whether the traffics are in an abnormal condition or not, grouping information displayed on the security cube and displaying feature information of each group on the security cube.

23. The method according to claim 22, wherein in the step of determining whether the traffics are in an abnormal condition or not, the group is monitored whether or not the group is in an abnormal condition, and the abnormal condition of the group is reported if the group is in the abnormal condition.

24. The method according to claim 22, wherein in the step of determining whether the traffics are in an abnormal condition or not, the security cube is sectored by a predetermined number of lattices, similarity of a predetermined lattice is compared with that of adjacent lattices, and the predetermined lattice and the adjacent lattices are determined as a same group if the similarity thereof is larger than a predetermined value.

25. The method according to claim 22, wherein in the step of determining whether the traffics are in an abnormal condition or not, abnormal traffic is determined using one of information including a port list per a protocol of a predetermined group, frequency per a port, a rate per a port for entire data, and a location and area of a group in a security cube.

26. The method according to claim 14, wherein in the step of determining whether the traffics are in an abnormal condition or not, the security cube is sectored into a predetermined number of areas, and traffics in a predetermined area are classified as a traffic having a feature of the area.

* * * * *